Oct. 11, 1955 R. D. JAMES 2,720,619
AUTOMATIC RESETTING POSITIONING CONTROL
Filed Jan. 11, 1949 4 Sheets-Sheet 1

INVENTOR.
RICHARD D. JAMES
BY
Herbert E. Metcalf
ATTORNEY

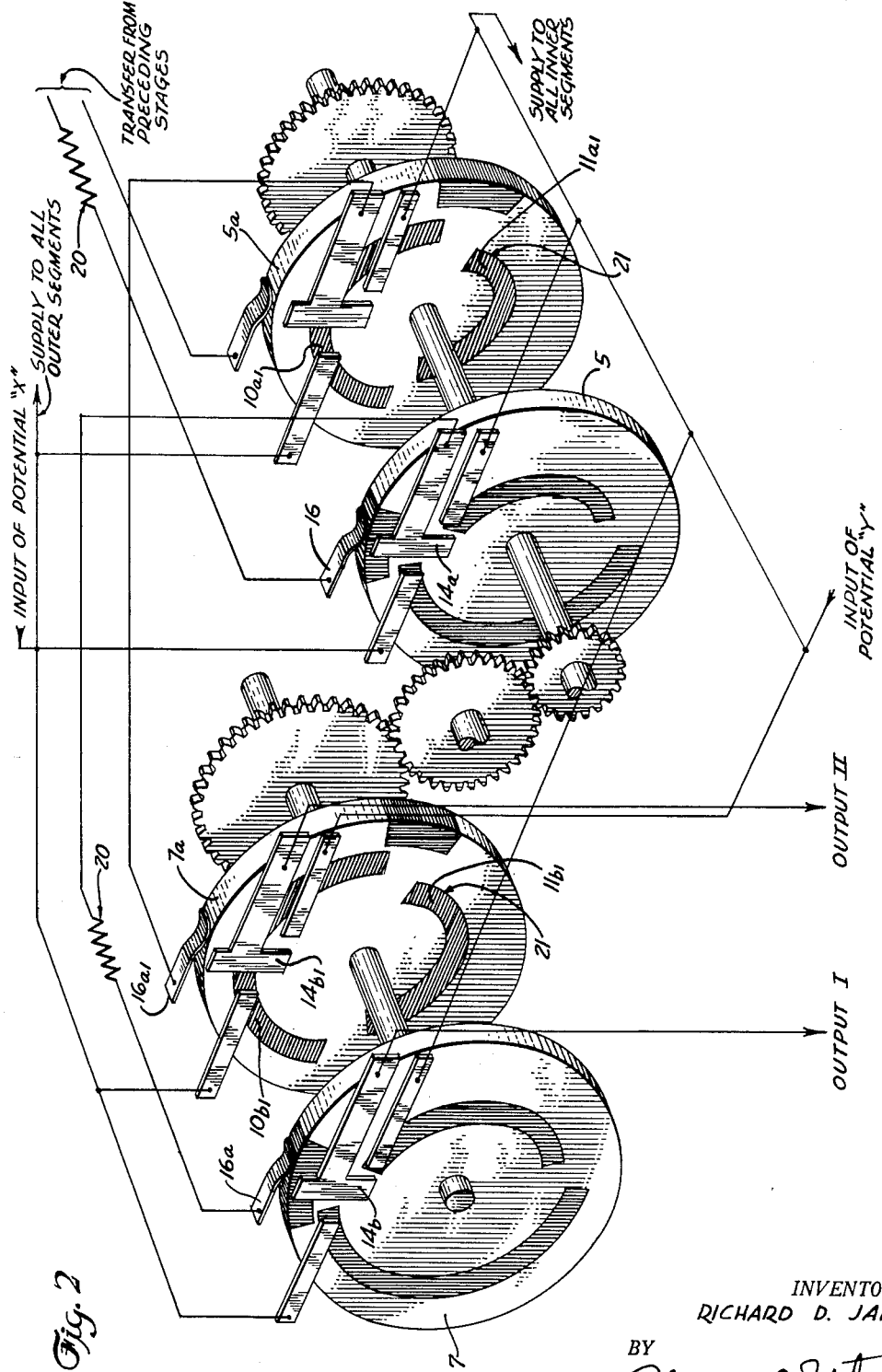

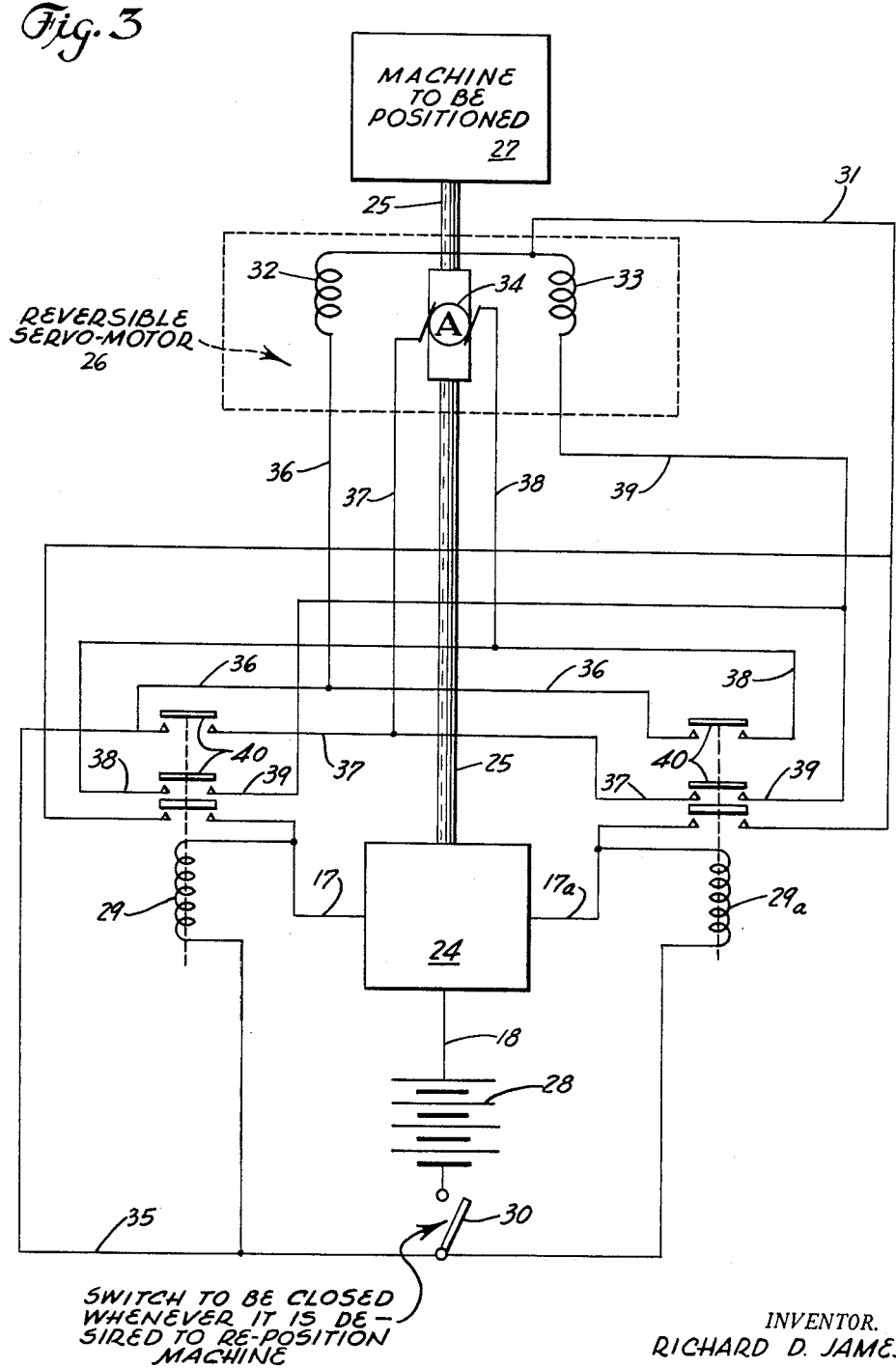

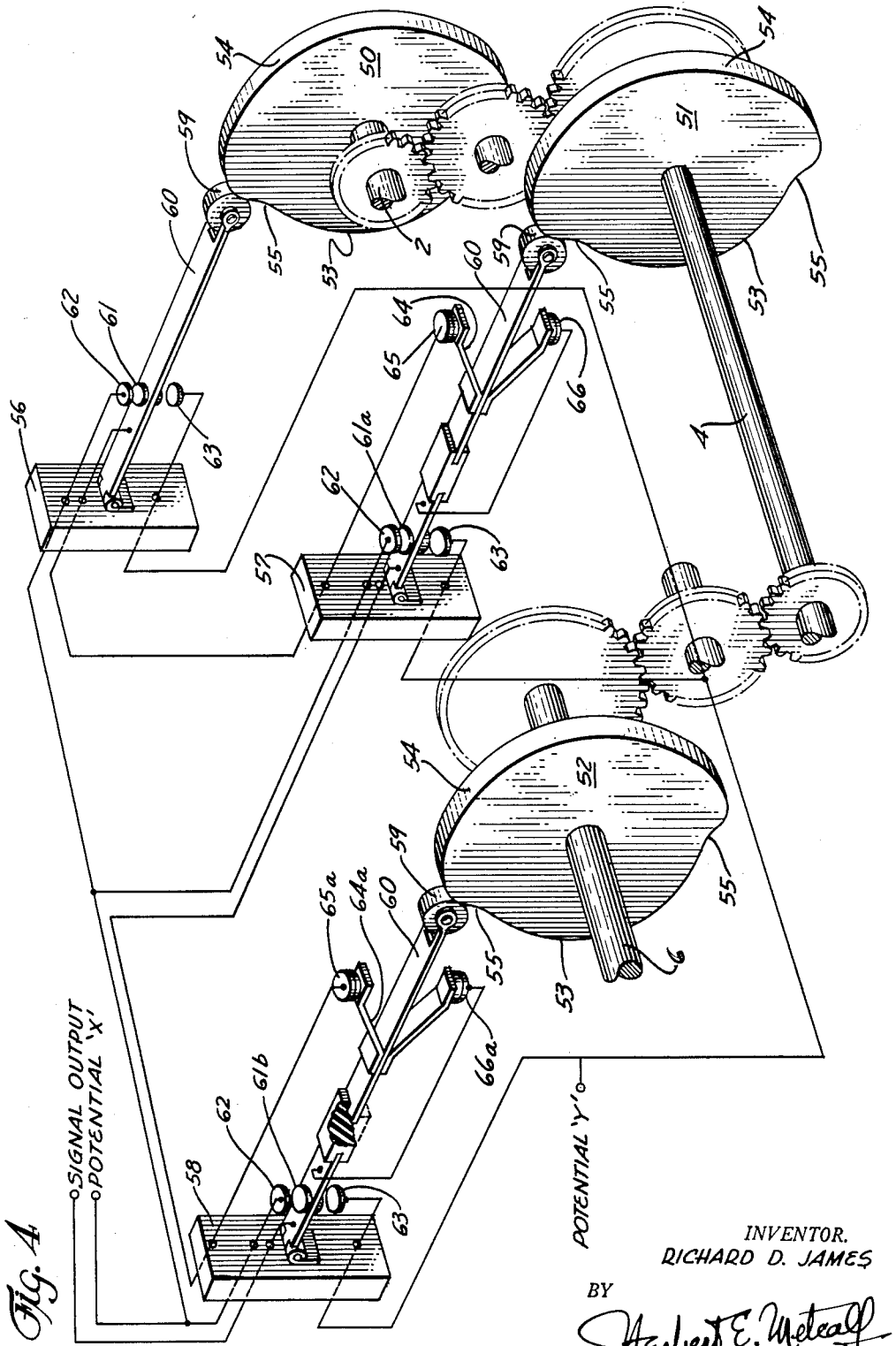

United States Patent Office 2,720,619
Patented Oct. 11, 1955

2,720,619

AUTOMATIC RESETTING POSITIONING CONTROL

Richard D. James, Long Beach, Calif., assignor to Northrop Aircraft, Inc., Hawthorne, Calif., a corporation of California Application January 11, 1949, Serial No. 70,336

7 Claims. (Cl. 318—31)

This invention relates to position control devices, and more particularly to a means and method for resetting or returning a given device to any predetermined position, or positions, and automatically stopping it there.

Countless machines and mechanisms require resetting at known positions, control of repeatable operations, limiting of operation at one or more predetermined positions, or indexing and counting operations.

It is an object of the present invention to provide a means which will indicate the angular position of a rotatable shaft with respect to a previously defined angular position of the shaft, and which will automatically provide intelligence in a form to drive the shaft by suitable means to this previously defined position.

Other objects and features of advantage will be specifically pointed out or noted in the description of specific apparatus to follow, but it is to be distinctly understood that the invention is not deemed to be limited to the specific apparatus shown herein, as various forms may be adopted, utilizing the principal method, within the scope of the appended claims.

In broad terms, the present invention comprises a succession of stages or "memories" each geared or otherwise connected for transmitting motion to adjacent stages, and provided with electrical contacts in such a manner that a complete circuit exists from an input to an output at all positions of a shaft connected to one of the stages except one position at which it is desired to reset to. Transfer of the signal paths from stage to stage provides an unlimited angular capacity of the system; that is, any desirable number of revolutions of this shaft from the "null" position may be obtained without going beyond the limit of the device to still "remember" the original position, and the signal transfer arrangement also prevents interruption or reversal of the signals at the end stages which are geared higher and thus control the angular accuracy of the reset position rather than the angular capacity. Electrical potentials, after passing through and being controlled by the position controlling device, are fed to a suitable servo system connected to drive the shaft which is being re-positioned.

This invention may be more fully understood by reference to the accompanying drawings, shown by way of illustration and not limitation, wherein:

Figure 2 is a perspective view showing a portion of the device of Figure 1 with several refinements added.

Figure 3 is a schematic diagram showing the positioning device connected with a servo motor for controlling a machine to be positioned.

Figure 4 is a perspective view showing, in diagrammatic form, another embodiment of the present invention.

Figure 1:
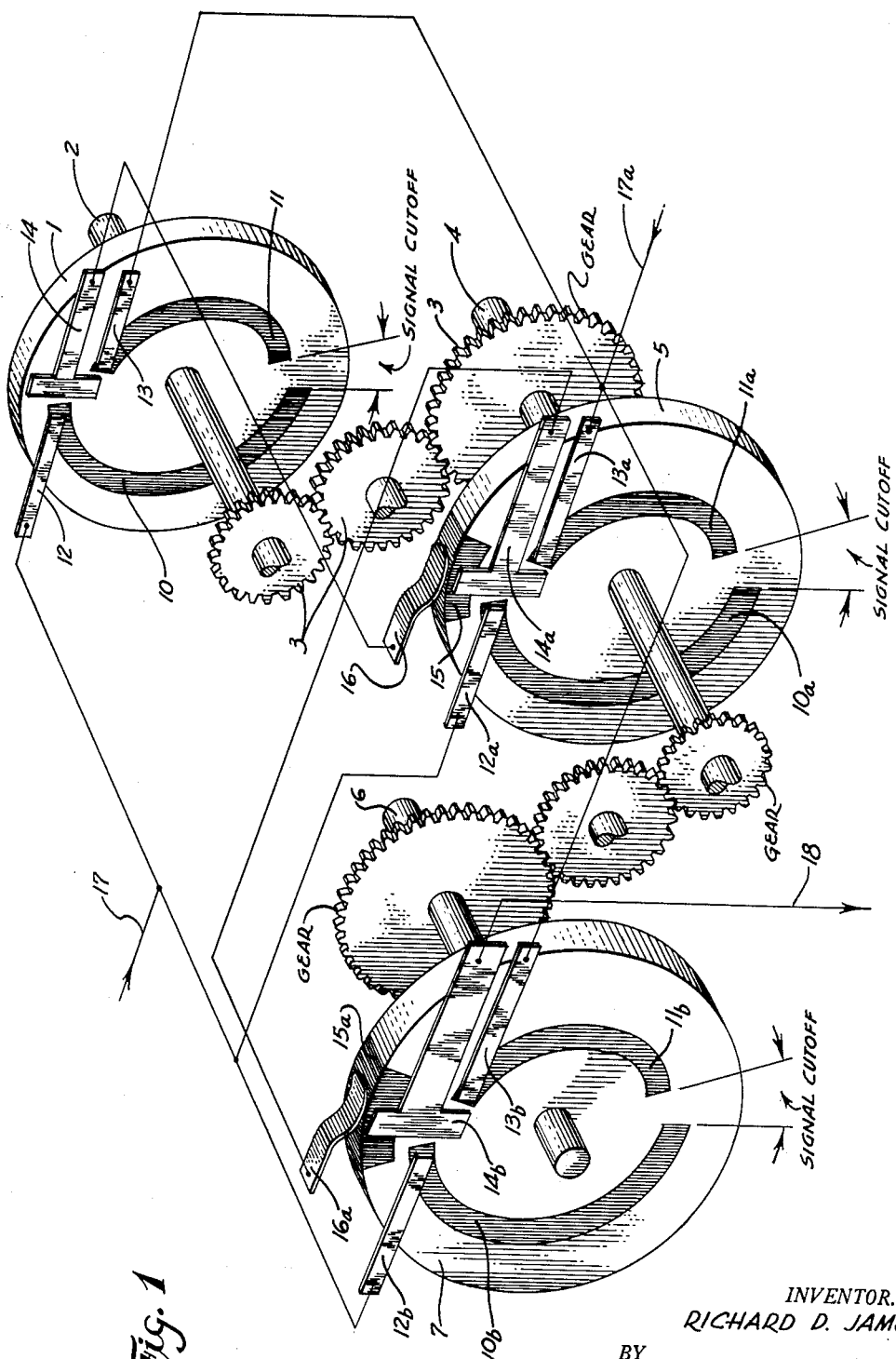
Figure 1 is a perspective view showing in diagrammatic form a positioning device embodying this invention.

Referring first to Figure 1, for a detailed description of my invention, a control wheel 1 is mounted on a control shaft 2. Control shaft 2 is connected by gearing 3 to an intermediate shaft 4 on which is mounted an intermediate wheel 5. Similarly, intermediate shaft 4 is geared to an output shaft 6 carrying an output wheel 7. Each of the three shafts 2, 4, and 6 is journalled in bearings all fixed to a common framework, as is customary. In Figure 1, the shafts are preferably geared so that each shaft will rotate in the same direction as the others.

Attached to one side of control wheel 1 near the rim is an outer segment 10 arcuate in shape and extending for somewhat less than halfway around the control wheel 1. Directly opposite outer segment 10 is an inner segment 11, also attached to the control wheel 1, located closer to the center, and also extending somewhat less than halfway around the control wheel 1, so that a diametrical gap is left across the wheel between the segment ends. Both segments have their centers of arc at the center of the control wheel 1, but the outer edge of inner segment 11 has a shorter radius than the inner edge of outer segment 10. The segments are electrical conductors while the control wheel 1 is made of some material considered to be a non-conductor.

An outer segment brush 12, fixed to the framework, rides on the outer segment 10 and a fixed inner segment brush 13 rides on the inner segment 11. An output brush 14, also fixed to the framework 9, is located so that at the "null" position of the control shaft 2 and wheel 1 it rests on the wheel, between the segments 10 and 11, and does not contact either segment. However, with rotation of the control wheel 1, the output brush 14 will come into contact with either the outer segment 10 or the inner segment 11, depending on the direction of rotation.

The intermediate wheel 5 is equiped with an outer segment 10a, inner segment 11a, outer segment brush 12a, inner segment brush 13a, and output brush 14a arranged substantially the same as on the control wheel 1. The output wheel 7 is similarly provided with segments 10b and 11b, and brushes 12b, 13b, and 14b.

On the intermediate wheel 5, a transfer segment 15 is attached at the rim and located opposite one of the gaps between the outer segment 10a and inner segment 11a: In the null position shown, the output brush 14a makes contact with this transfer segment 15, but when the intermediate wheel 5 is rotated a given amount, that contact will be broken. Also contacting transfer segment 15 is a fixed transfer brush 16 which contacts the transfer segment 15 substantially the same as the output brush 14a. The output wheel 7 is similarly provided with a transfer segment 15a and transfer brush 16a.

Outer segment brushes 12, 12a, and 12b are electrically connected together by a lead-in wire 17, for example. Inner segment brushes 13, 13a, and 13b are electrically connected together by a second lead-in wire 17a. Output brush 14b is connected to output wire 18 leading outside the unit. Output brush 14 is wired to transfer brush 16 within the unit, and output brush 14a is wired to transfer brush 16a.

The arc of contact between transfer brush 16 and transfer segment 15, the gear ratio through the gear train from control shaft 2 to intermediate wheel 5, and other mechanical factors are so chosen and controlled that:

Contact between output brush 14a and either outer segment brush 12a or inner segment brush 13a will be established before contact between output brush 14a and transfer brush 16 is broken.

Contact between transfer brush 16 and transfer segment 15 will be broken a considerable time before control shaft 2 has turned through an angle sufficient to cause contact between output brush 14 and outer segment 10 or inner segment 11 to reverse at the signal cut-off position, which is the position occupied after one-half revolution of the control shaft 2.

Similarly, between intermediate wheel 5 and output wheel 7, contact between output brush 14b and either outer segment brush 12b or inner segment brush 13b will be established before contact between output brush 14b and transfer brush 16a is broken; and, contact between transfer brush 16a and transfer segment 15a will be broken a considerable time before the intermediate shaft 4 has turned through an angle sufficient to cause contact between output brush 14a and outer segment 10a or inner segment 11a to reverse at the signal cut-off position of intermediate shaft 4.

In addition, the following conditions have been met:

Control shaft 2 will never be turned from the null position by an amount sufficient to cause contact between output brush 14b and outer segment 10b or inner segment 11b to break at the signal cut-off position. Lead-in wire 17 to the outer segment brushes 12, 12a, and 12b is supplied with an electrical potential "X". Lead-in wire 17a to the inner segment brushes 13, 13a, and 13b is supplied with an electrical potential "Y," differentiated from potential "X" in some respects, i. e., different phase, voltage, current, or the like.

In Figure 1, the device is to be subsequently located at an angular position corresponding to the position shown. It will now be shown that as control shaft 2 is rotated from the null position illustrated, in either direction, that a continuous electrical signal is supplied at output brush 14b which identifies the direction of rotation.

In the position of the control device shown, no electrical circuit exists between either source of potential and output brush 14b, thus determining the "null." If control shaft 2 is rotated a fraction of a revolution clockwise, contact will be established between outer segment brush 12 and output brush 14 through outer segment 10. Electrical potential "X" will thus be communicated through outer segment 10 to output brush 14 to transfer brush 16 to transfer segment 15 to output brush 14a to transfer brush 16a to transfer segment 15a to output brush 14b.

Upon further rotation of control shaft 2 in a clockwise direction, intermediate shaft 4 will rotate an angular distance sufficient to break contact between transfer brush 16 and transfer segment 15. This will occur before output brush 14 has broken contact with outer segment 10. Therefore, it is impossible to communicate potential "Y" through the circuit by contact between output brush 14 and inner segment 11 at the signal cut-off position, even if inner segment brush 13 were in contact with inner segment 11. Furthermore, the above-mentioned break between transfer brush 16 and transfer segment 15 will occur after contact has been established between outer segment brush 12 and output brush 14a, through outer segment 10a. This assures continuity of the signal from the input of potential "X," the latter now being fed into the circuit by means of outer segment brush 12a.

Upon further rotation of control shaft 2, signals from output brush 14 continue to be open-circuited by lack of contact between transfer brush 16 and output brush 14a. However, signals due to contact between outer segment brush 12a and output brush 14a through outer segment 10a are supplied to transfer brush 16a to transfer segment 15a to output brush 14b. Continuity of the signal from input potential "X" is thus maintained.

As control shaft 2 continues to rotate, transfer brush 16a will break contact with transfer segment 15a and open circuit potential "X" being supplied from output brush 14a. As during the transfer from the previous stage, this will occur before output brush 14a has broken contact with outer segment 10a at the signal cut-off position of intermediate shaft 4, and after contact has been established between outer segment brush 12b and output brush 14b through outer segment 10b. This timing again prevents the introduction of potential "Y" and assures the continuity of intelligence transmitted in the form of potential "X" from previous stages.

Control shaft 2 may now rotate until contact between output brush 14b and outer segment brush 12b, by way of outer segment 10b, is about to be broken at the signal cut-off position of output shaft 6. This limit defines the maximum angular displacement of control shaft 2 for preservation of the "memory" of the null position.

It is now apparent that if control shaft 2 is rotated in the opposite direction from null (counterclockwise) from that described above, that the same sequence of operation is obtained except that inner segments 11, 11a, and 11b are used in conjunction with inner segment brushes 13, 13a, and 13b to pass potential "Y" continuously as the intelligence. Since the two potentials differ from one another in some respect, the two directions of rotation are identified.

In the above-described operations, the potential supplied to output brush 14b has continual correspondence to the direction of angular displacement of control shaft 2, and this potential may be used to institute corrective rotation of the shaft to null through use of a servo system.

In addition to indicating the direction of angular displacement, this invention can be made to approximate the magnitude by introducing resistors 20 or the like between output brush 14 and transfer brush 16, and between output brush 14a and transfer brush 16a, as shown in Figure 2. The value of these resistors is designed in such a manner as to suitably vary the value of the electrical output potentials in accordance with the length of the circuit path from input to output. Then the system of Figure 1 will operate as follows:

In a position close to null, before the control wheel 1 has reached its cut-off position, the input signal would pass through the two above-mentioned resistors and cause a drop in the output potential. Farther from null, after control wheel 1 has passed the cut-off position, one of these resistors would be shorted out, thus raising the output potential. Still farther from null, after intermediate wheel 5 has passed its cut-off position, both resistors would be shorted out, thus raising the output potential to substantially the value of input potential. If a system using a servomotor to drive control shaft 2 back to null is connected and energized, the speed of return at positions relatively far from null would be faster than the return speed at positions relatively close to null, therefore giving a faster resetting operation and yet not tending to overrun the null position and cause hunting. This method will be referred to later.

Or, the potential at output brush 14b can be made to vary in proportion to the angular displacement from null by replacing the arc-shaped segments with resistance windings 21, as shown for two stages in Figure 2. These windings, or some other type of variable resistance construction, are of the tapered-resistance type, thus varying the resistance between the segment input brushes and the output brush as the wheel is turned. The segment brushes may be located in a number of places around the wheel from the output brush, so long as the conditions as set forth above are still complied with.

The device of the present invention is almost limitless in the number of different ways it can be set up. Several of the ramifications, in particular, should be noted, and a brief discussion of these follows.

Either control shaft 2, intermediate shaft 4, or output shaft 6 may be the shaft that it is desired to locate, depending upon the angular range or accuracy through which the shaft must rotate. Also, an external shaft, connected to the device through suitable gearing, may be introduced into the system.

The capacity or accuracy of the device may be increased without limit by the addition of stages identical to those on intermediate shaft 4 and output shaft 6.

The angular position of each shaft with respect to fixity may be altered by reorienting the segments about each shaft, or the brushes about each shaft, to comply with the angular position desired.

The number of sets of segments or brushes operating at each stage or "memory" is unlimited, thus permitting a number of null positions to be maintained in the device for use as desired. For example, as shown in Figure 2, the output stage and intermediate stage contain respectively a second output wheel 7a and a second intermediate wheel 5a, each with a complete set of segments and brushes. Their input segments 10a1, 10b1, 11a1, and 11b1 are connected to the same respective supply wires as the other input segments. Similarly, all other stages not shown have an identical duplicate wheel, and the respective output brushes and transfer elements of these duplicate wheels ultimately feed into the transfer brush 16a1 of the second output wheel 7a, to form an additional output channel.

Thus, the circuit ending with Output II from output brush 14b1, if externally connected, can determine a second null position differing from that obtained if using the circuit of Output I from output brush 14b. All the additional duplicate wheels are adjusted relative to their respective shafts to obtain the desired second null position, observing the same conditions as set forth for the original circuit.

Correspondence between angular position of the shafts and fixity can be obtained by placing numbers about the shafts. These numbers may be used to facilitate positioning of segments or brushes to set the null position as being identical with any desired angular position. In one arrangement using this numbering method of shaft positioning, wheels carrying numerals from 0 to 9 on the rims were permanently fixed, one to the shaft of each stage, while the segment-mounting wheels were connected to the shafts so as to permit relative movement around the shaft, with locking means provided to set them at any desired position. With a gear ratio of ten to one between adjacent stages, the device was then similar to a conventional decimal counter, and could be set to have a null position at any desired number. The numbers, of course, represent revolutions of the input control shaft.

The gear trains may be modified to produce the ratio or arrangement desired, or be replaced by belts, friction wheels, Geneva movements, or the like, for transmitting motion from one shaft to another.

This invention will also transmit intelligence giving direction and magnitude of angular displacement of a shaft by the use of a single input potential. In this case, referring again to Figure 1, the input signal will enter the device at output brush 14b and will be transmitted either to lead-in wire 17, or to the second lead-in wire 17a, except when in the null position. Whichever lead-in wire is carrying current then, identifies the direction of displacement from null, and the amount of current flowing, assuming an internal electrical design as noted above, identifies the magnitude of displacement.

In Figure 3, one example is shown of a complete positioning control system adapted to reset automatically any given machine to a predetermined position whenever desired. The positioning control device 24 of the present invention is here connected to use a single constant-potential input with two alternately-conducting output circuits, as briefly described in the preceding paragraph.

A main shaft 25, or other positive connecting means, is directly connected to the positioning control 24 (preferably to control shaft 2 in Figure 1), to a variable-speed, reversible D. C. motor 26, and to some machine 27 to be positioned. The machine 27 is complete within itself, including power supply, and when operated it will rotate main shaft 25 accordingly. The machine 27 will also be driven by the main shaft 25 when the shaft is revolved by other means.

The positive side of a battery 28, or other power supply, is connected by output wire 18 to output brush 14b of the positioning control 24. Lead-in wire 17 of positioning control 24 is connected through a relay winding 29 to a switch 30 connected to the negative side of battery 28. Similarly, the second lead-in wire 17a is connected through a second relay winding 29a to the same switch 30. When the switch 30 is closed, if the positioning control 24 is not at the null position, one of the relays will be energized, depending on which direction from null the main shaft 25 has been turned.

Motor 26 is of the compound-wound type, comprising a shunt field 32, series field 33, and armature 34. A positive motor wire 31 is connected to the shunt field 32 and the series field 33. A negative motor wire 35 connects from the switch 30 to the other side of motor 26 partially through various contacts actuated by the two relay windings 29 and 29a. These contacts serve to reversibly connect the winding of the armature 34 in the motor circuit to obtain rotation of the motor 26 in either direction, which is well-known in the art.

The motor circuit and relay contacts are arranged in the following manner. A shunt lead 36, left armature lead 37, right armature lead 38, and series lead 39 extend from the motor 26. Shunt lead 36 is always connected to negative motor wire 35. On each relay winding 29 and 29a are positioned triple-pole relay connectors 40, each pole connecting two contacts when the respective relay winding is energized, and breaking these contact connections when the winding is de-energized. When relay winding 29 is energized, its contacts close to connect shunt lead 36 with left armature lead 37, right armature lead 38 with series lead 39, and positive motor wire 31 to the positive side of battery 28 through positioning control 24, thus operating motor 26 in a certain direction. When the second relay winding 29a is energized instead of the first, its contacts close to connect shunt lead 36 with right armature lead 38, left armature lead 37 with series lead 39, and positive motor wire 31 to the positive side of battery 28 through positioning control 24, thus operating motor 26 in the opposite direction.

When motor 26 is running, the main shaft 25 to which it is connected is turning the machine 27 and also turning control shaft 2 of the positioning control 24. Direction of motor operation is always in a direction to turn the positioning control 24 toward null, and when this point is reached, the motor circuit will be opened by the breaking of contact between output brush 14 and either outer segment 10 or inner segment 11, as previously described, even if switch 30 is still closed. The machine 27 is now positioned where desired, in accordance with previous calculations and adjustments.

Thus, it is seen that a machine may be operated to any position of its cycle, with switch 30 open, and then be reset to any particular position previously decided upon by closing switch 30. This switch may be linked to the machine 27 in such a manner as to automatically close when a repositioning operation is desired, and then released, so that continuous "hands-off" operation may be obtained.

It will be noticed that the positioning control 24 of Figure 3 is a part of the circuit of the motor 26. This means that any resistance added within the control 24 will cause a slower motor speed. Therefore, with inter-stage resistors or resistance-wound segments, as described before, motor speed will be fastest when the control 24 is farthest from null, and slowest when closest to null. This speeds up the operation considerably without sacrificing the accuracy of setting at the null position.

If the machine to be reset performs repeating operations continuously, the external D. C. motor 26 of Figure 3 may be eliminated in favor of the normal actuator of the machine. That is, switching could be arranged to make the system shown in Figure 3 control the movement of the normal machine actuator so that the motor 26 becomes unnecessary. The main shaft 25 could then be reduced to a much smaller size, it being required only to drive the positioning control 24.

It is also apparent that if operation in both directions from the null is not required, only one segment and potential supply brush per wheel are needed. This one segment could then be nearly a complete circle, and the angular range of each wheel in one direction as compared to that of a similar system having double segments would be approximately doubled.

The basic design of the positioning control may be modified by using cams operating three-position switches to transfer intelligence from "memory" to "memory," or other suitable mechanical and electrical means as desired. One such embodiment is shown in Figure 4. Here, shafts 2, 4, and 6 remain unchanged, together with their connecting means, but a control cam 50, intermediate cam 51, and output cam 52 replace the previous wheels. Each cam comprises a nearly semicircular, arcuate, inner cam surface 53 on one side, and a similar outer cam surface 54 on the opposite side, the two surfaces being smoothly joined by slope surfaces 55.

A control switch 56, intermediate switch 57, and output switch 58 are fixed near each respective cam, each with an actuating roller 59 riding on its respective cam. Each actuating roller is carried by a pivoted switch arm 60 mounting an output contact 61, 61a, and 61b respectively. The arms 60 are spring-loaded downwardly so that the rollers 59 are elastically urged toward the cam centers; therefore, physical contact between each roller and its respective cam surfaces is always maintained.

These output contacts 61, 61a, and 61b each move between two fixed input contacts attached to each switch. Top input contacts 62 are supplied by a potential "X" and bottom input contacts 63 are supplied by a potential "Y." When the actuating roller 59 at any cam is riding on its inner cam surface 53, the respective output contact is electrically connected with its bottom input contact 63, and similarly, when the actuating roller 59 is riding on its outer cam surface 54, the output contact is connected with its top input contact 62. When any actuating roller 59 is positioned on one of the slope surfaces 55, its output contact is open-circuited from both input contacts 62 and 63, which is the position illustrated.

A conducting button 64, mounted in the switch arm of intermediate switch 57, provides an intermittent circuit path from top to bottom, depending on the position of the button and arm in a vertical plane. For this purpose, the button 64 is adapted to touch an upper contact 65 and a lower contact 66. Upper contact 65 is electrically connected to output contact 61 and lower contact 66 is connected to output contact 61a. In a central position, both contacts 65 and 66 are in simultaneous contact with the top and bottom, respectively, of the button 64, thus connecting output contact 61 to output contact 61a through button 64. As the actuating roller 59 moves the switch arm and conducting button 64 upwardly, lower contact 66 separates from the bottom of button 64, thereby opening the circuit between output contacts 61 and 61a. Similarly, as conducting button 64 is moved downwardly from its central position, upper contact 65 separates from the top of button 64, again opening the transfer circuit between output contacts 61 and 61a. Output contact 61a is electrically connected to conducting button 64 onl through lower contact 66.

Output contact 61a is connected to a second conducting button 64a similarly arranged at output switch 58, with additional upper and lower contacts 65a and 66a respectively. As can be seen from the above, a null position of the device occurs when all actuating rollers 59 are riding on their respective slope surfaces 55; i. e., no complete circuit exists between the output contact 61b and either of the two potentials "X" or "Y."

The design of the contacts and the motion transmitting ratio between successive shafts is such that the conducting button 64 or 64a at either switch will break connection between the output contact of that switch and the preceding switch after contact has been made between either input contact and the output contact at that switch, and such that this open circuit at the conducting button will occur before contact has been broken between the active input contact and the output contact at the preceding switch due to a rotation of the preceding shaft amounting to 180° from its position at null, which places the roller 59 on the opposite slope surface 55 approximately 180° from null.

The foregoing arrangement and construction of cams and switches performs the same function as the brushes and segments previously described, and the two means are equivalent. Therefore, the same modifications and additions can be made to the cam and switch assembly as are possible with the basic segment and brush system, with the obvious exception that tapered resistance windings cannot be incorporated in the former. Externally, the positioning control is identical in either case.

It is thus clearly seen that the present invention is capable of automatically providing electrical potentials corresponding to the sense and magnitude of angular displacement of its input shaft in either of two directions from its null position. In tests of this device, these potentials were satisfactory for use in a servo system.

It is also capable of use on a great variety of machines. Examples of such machines include rifle and gun turrets, radio gear, automatic sextants, machine tools, processing and packaging machinery, and the like. Where lightness in weight is important, the present invention is of great advantage in that it can be made very small and compact. One model, incorporating five stages and containing two segment wheels at each stage, is slightly less than two inches in the longest dimension.

What is claimed:
1. In an automatic resetting positioning control, a plurality of memory stages connected in series, each stake comprising a rotatable shaft with a non-electrical conducting control wheel having a driven connection with said shaft, each shaft being connected with the shaft of the next succeeding stage to transmit rotation thereto at a predetermined ratio producing progressively lesser rotation relative to the first of said shafts, a constant-radius electrical conducting segment somewhat shorter than a semicircular arc fixed on each of said wheels, means for electrically connecting a common lead-in wire to each of said segments, a second constant-radius electrical conducting segment of substantially different radius than first said segment and somewhat shorter than a semicircular arc also fixed on each of said wheels but positioned opposite said first segment, means for electrically connecting a second common lead-in wire to each of second said segments, a stationary output member at each of said wheels adapted to make electrical contact with one or the other of said two segments, but not both at the same time, as said wheel is rotated, and said output member positioned so that at one null position only of said positioning control none of said output members makes contact with either one of its respective segments, an electrical conducting transfer plate fixed to each of said wheels except said first wheel and located adjacent one end of each of said two segments thereon in position to be contacted by said output member at said null position, and means for conducting electrical current from each of said output members except the output member on the last of said wheels to the transfer plate on the next succeeding wheel, the motion transmitting ratio between said shafts and the arcuate length and positioning of said transfer plates being such that as said shafts are rotated in one direction from said null position in accordance with said motion transmitting ratio, contact between said output member and said transfer plate on any one wheel will be broken after contact between said output member and said first segment on the same wheel has been made and before contact between the output member and first segment of the preceding wheel has been broken, and such that as said shafts are rotated in the opposite direction from said null position in accordance with said motion transmitting ratio, contact be- tween said output member and said trasfer plate on any one wheel will be broken after contact between said output member and said second segment on the same wheel has been made and before contact between the output member and second segment of the preceding wheel has been broken, whereby a complete electrical circuit is obtained between first said lead-in wire and the output member of said last wheel to the exclusion of second said lead-in wire at all times when said positioning control is turned in said one direction from said null position, up to that position where contact is about to be broken between the first segment and output member of said last wheel, and whereby a complete electrical circuit is similarly obtained between said second lead-in wire and the output member of said last wheel to the exclusion of said first lead-in wire when said positioning control is turned in said opposite direction from said null position, but no such circuit whatsoever is obtained at said null position.

2. Apparatus in accordance with claim 1 wherein at least one of said means for conducting electrical current from each of said output members except said last output member to the transfer plate on the next succeeding wheel includes a resistor or the like.

3. Apparatus in accordance with claim 1 wherein at least one of said segments is a tapered resistor.

4. Apparatus in accordance with claim 1 wherein said two segments and said transfer plate at each of said stages are movable about their respective shafts relative to said shafts.

5. Apparatus in accordance with claim 1 wherein said means for connecting said lead-in wires to said segments are stationary electrical brushes riding on said wheels in position to slidably bear upon their respective segments; said means for conducting current from said output members to said transfer plates are stationary electrical brushes riding on said wheels in position to slidably bear upon their repective transfer plates, and electrically connected to their respective output members; and wherein said output members are stationary electrical brushes riding on said wheels in position to slidably bear upon their respective segments and transfer plates.

6. Apparatus in accordance with claim 1 wherein said means for connecting said lead-in wires to said segments are electrical brushes riding on said wheels in position to slidably bear upon their respective segments; said means for conducting current from said output members to said transfer plates are electrical brushes riding on said wheels in position to slidably bear upon their respective transfer plates, and electrically connected to their respective output members; said output members are electrical brushes riding on said wheels in position to slidably bear upon their respective segments and transfer plates; said brushes being movable about their respective shafts relative to said shafts.

7. Apparatus in accordance with claim 1 including an identical additional complete set of segments, transfer plate, output member, lead-in wires, and electrical connecting and conducting means provided at each of said stages, the additional first and second lead-in wires being joined respectively to the original first and second lead-in wires, said additional set positioned to determine a second null position through a circuit beginning with the same lead-in wires and ending with the output member of said additional set at the last of said stages.

References Cited in the file of this patent

UNITED STATES PATENTS

| | | |
|---|---|---|
| 1,123,067 | Barkhausen et al. | Dec. 29, 1914 |
| 1,424,702 | Wissinger | Aug. 1, 1922 |
| 1,508,796 | Kaminski | Sept. 16, 1924 |
| 1,777,796 | Hubbell | Oct. 7, 1930 |
| 2,462,033 | Yardeny | Feb. 15, 1949 |

FOREIGN PATENTS

| | | |
|---|---|---|
| 507,305 | Great Britain | June 13, 1939 |